June 16, 1936.  J. L. ANDERSON  2,044,491
MANUFACTURE OF PIPE OR TUBING
Filed Oct. 10, 1933
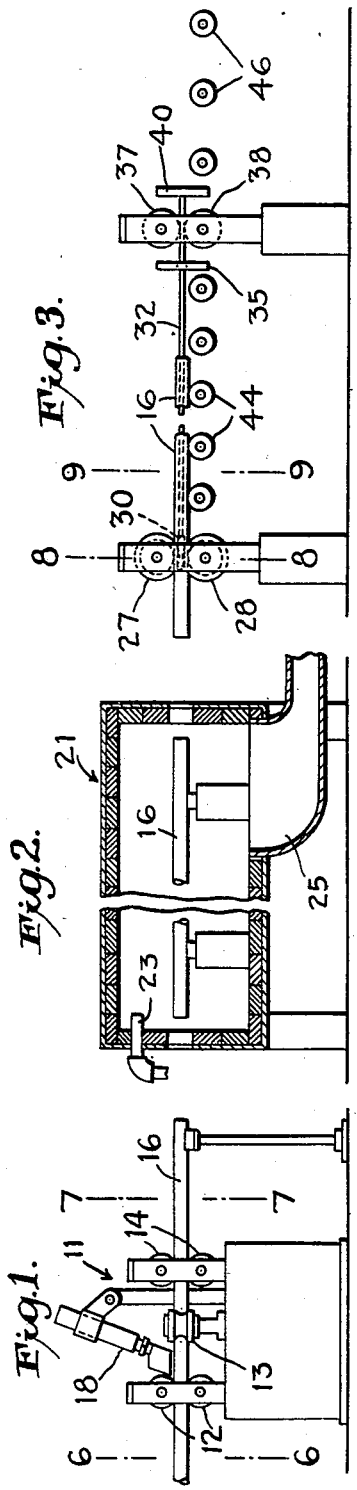
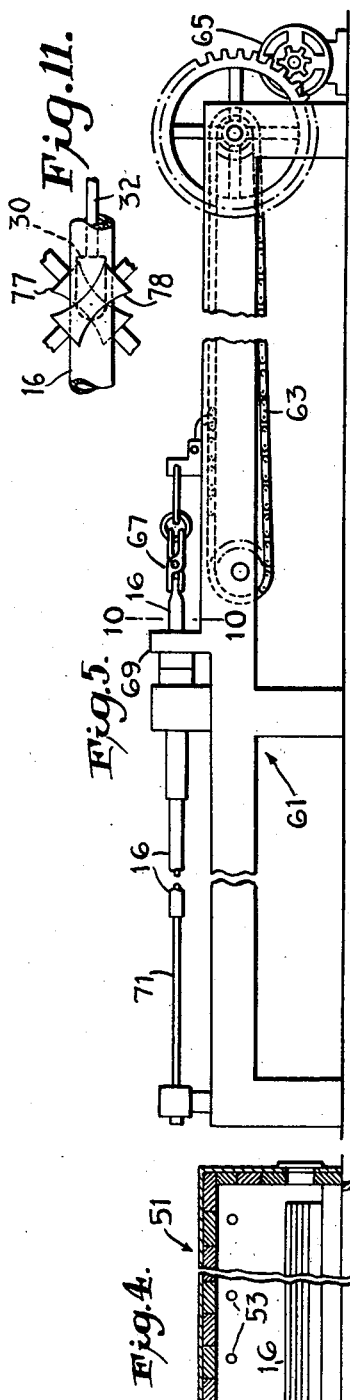
INVENTOR
James L. Anderson
BY J. V. Brandenburg
ATTORNEY Patented June 16, 1936

2,044,491

UNITED STATES PATENT OFFICE 2,044,491

MANUFACTURE OF PIPE OR TUBING

James L. Anderson, Closter, N. J., assignor to Air Reduction Company, Incorporated, New York, N. Y., a corporation of New York Application October 10, 1933, Serial No. 692,970

11 Claims. (Cl. 29—156)

This invention relates to the manufacture of pipe and tubing.

It has for its ultimate object the production of pipe or tube of accurate size and wall thickness, and of fine finish and exceptionally high physical properties. It is also an object to produce, economically and by simple steps, a superior commercial grade of pipe or tube suitable for purposes for which the extreme physical properties and high finish are not required.

Manufacturers of welded tubing have resorted to cold drawing operations when required to meet rigid specifications for diameter, thickness, and finish.

After the welding operation, the tubes are prepared for cold drawing by a grinding operation, which removes excess metal in the weld on the outside of the tube and may also eliminate weld marks caused by irregularity in the flow of the metal or marks caused by rolls or other parts of the welding machine. The tubes are then passed to the cold draw bench. Some manufacturers subject the tubes to a preliminary straightening operation either before or after grinding.

Because of the difficulty encountered in the removal of any inside bead or reinforcement, it is customary to endeavor to weld the tubing so that the weld penetrates only the entire thickness of the metal, with the machine adjusted so that no excessive thickening is produced or bead thrown out on the inside of the tube. Such a weld requires accurately made strip material and a critical adjustment of the welding machine.

It is possible accurately to size and finish such a tube to outside dimensions, and to reduce the wall thickness very slightly, if this is necessary, without resorting to any normalizing or annealing operation. This procedure does not produce a high grade tube because the weld does not in any way approach the fine granular structure of the strip from which the tube was made.

When tubing having better characteristics is required, a normalizing operation is usually performed directly after the welding operation, with or without a grinding operation. Tubing treated in this way can be cold drawn with a very considerable reduction in diameter and also a very considerable reduction in thickness in a single pass, thereby working the weld metal more severely than is possible without normalizing.

In both of the processes described it is essential that the bead or reinforcement on the inside of the tube be accurately controlled, since the inner surface of the tube can not be ground. For many uses of the final product, an internal protrusion of the weld is objectionable. If there is an internal flash which is rather high and narrow, it becomes folded over on the inside wall in the cold-drawing operation, producing a defect. On the outside, any pronounced reinforcement or bead quickly destroys the dies used for the cold drawing operation and makes the cold drawing of such tubing entirely impractical. Hence the necessity for grinding off external weld thickening.

In quantity production, precautions taken to insure the welding of the tubing with substantially no internal reinforcement or bead are apt to involve sacrifice in economy, speed and/or weld quality, and require the use of more expensive and better prepared strip material.

Another known method of producing pipes and tubes is the seamless process in which a hot billet is pierced and by successive operations rolled to a pipe or tube of the desired size and thickness. The production of tubing by this process requires expensive equipment, and a great drawback is that the wall thickness of the tubing is seldom uniform. The variations in wall thickness cause differences in the strength of the tubes and makes them unsuitable for uses requiring uniform strength or dynamic balance of the tube.

An object of this invention is, by an economical and easily practised process, requiring a moderate plant investment, to produce high grade pipe and tubing of high physical properties, fine internal and external finish, and uniform wall thickness.

Another object is to produce, by a process involving welding, pipe and tubing superior to that obtained by existing seamless processes.

Tubing made according to the method of this invention is, or may be, welded with an internal reinforcement or bead. This insures complete penetration of the weld, makes critical adjustment of the welding machine and great skill on the part of the welder unnecessary, permits fast welding, and allows the use of imperfectly formed and inexpensive strip material. An advantage in welding the tube with internal reinforcement is that it makes possible, subsequently, more working of the weld metal and adjacent tube material.

Following the welding step of my improved process, the tube is heated in a furnace and then removed from the furnace and passed through rolls over a plug of circular cross-section, which controls the inside diameter of the tube. In a single hot rolling pass, the plug smoothes out the inside weld reinforcement or bead while the rolls are reducing the outside diameter of the tube, or the wall thickness, and in some cases both. Rolls may be employed, in conjunction with a plug, which decrease the wall thickness, or both decrease the wall thickness and increase the inside diameter, without necessarily decreasing the outside diameter.

The rolls work the weld metal more than the metal in the balance of the tube because of the greater thickness of the material at the weld. After passing over the plug between the rolls, the tube is of uniform wall thickness and diameter. The tube is then normalized to improve the grain structure and is finished by a cold drawing operation.

Other objects, features and advantages of the invention will appear or be pointed out as the specification proceeds.

In the accompanying drawing, forming part hereof:

Fig. 1 is a diagrammatic side elevation of a welding machine with a tube passing through the welding operation.

Fig. 2 is a diagrammatic sectional view of a furnace in which the tube is heated after welding.

Fig. 3 is a diagrammatic side elevation of the apparatus in which the tube is passed over a plug and between rolls after heating in the furnace of Fig. 2.

Fig. 4 is a diagrammatic sectional view of a soaking furnace in which the tubes are reheated for normalizing, this view being illustrative of the normalizing step of the invention.

Fig. 5 is a diagrammatic side elevation of a draw-bench with a tube passing through the cold drawing operation.

Figs. 6 and 7 are enlarged sectional views on the lines 6—6 and 7—7, respectively, of Fig. 1.

Figs. 8 and 9 are enlarged sectional views on the lines 8—8 and 9—9, respectively, of Fig. 3.

Fig. 10 is an enlarged sectional view on the line 10—10 of Fig. 5, illustrating the reduced diameter of the finished tube as compared with Fig. 9.

Fig. 11 is an enlarged side elevation showing cross rolls which may be used in place of the rolls illustrated in Fig. 3.

A welding machine 11 has feed rolls 12, "welding" rolls 13, so-called because of their proximity to the weld, and sizing rolls 14 which assist in driving the tube through the machine. A tube 16 is fed to the machine in the form of open-seam stock, as shown in Fig. 6. The width of the seam is controlled by the spacing of the feed rolls 12 and welding rolls 13 in a well understood manner. The seam passes a seam heating or fusing agency, preferably an oxyacetylene welding torch 18 having a seamwise-extended system of flame.

By the increment or gradual heating of the seamwise-extended, high-temperature flame system of such a torch, the edges of the seam are brought to fusion and unite in a long puddle, or are united with the aid of transverse compression by the "welding" rolls. Welding to complete penetration is insured by the production of a reinforcement or bead 19 (Fig. 7) inside the tube, along the line of the weld. There may also be a bead 20 on the outside. Hitherto, when there has been an inside reinforcement or bead, it has been difficult or quite impossible to make high-grade finished tube by welding tubularly-formed strip stock, followed by normalizing the welded tube, followed by cold drawing. By this invention, the production of a bead becomes an advantage.

During the welding operation the tube is highly heated in the region of the weld. In the next step of my process the body of the tube and the metal of the weld are heated to a temperature of approximately 1800–2200° F. in a furnace 21, shown in Fig. 2. This temperature is somewhat higher than is required for the hot rolling step and allows for some loss of heat between the time that the tube leaves the furnace 21 and the completion of the rolling operation.

The furnace 21 is heated by a burner 23. Breeching 25 connects the furnace with a chimney or flue. Fig. 2 shows the tubing 16 in the furnace during the heating step of the process.

The tube is removed from the furnace 21, and while hot is passed between driven rolls 27 and 28 and over a plug 30 which is located between the rolls 27 and 28. The plug 30 is held in position by a mandrel 32. The end of the mandrel remote from the plug passes freely through a plate 35 and is gripped by rolls 37 and 38 which are inactive during a rolling operation but operate to withdraw the mandrel after each tube section has been rolled. An abutment 40 serves as a positive stop to prevent the mandrel from moving during a rolling operation. The abutment 40 is removed when the mandrel is to be withdrawn from the tube.

Rollers 44 support the tube 16 after it passes through the rolls 27 and 28. When the mandrel 32 is to be withdrawn from the tube, the abutment 40 is removed and the rolls 37 and 38 operated to move the mandrel to the right in Fig. 3, where it is supported by rollers 46. The opening through the plate 35 is smaller than the tube 16.

Fig. 8 shows a section through the plug 30, tube 16, and a part of the rolls 27 and 28. The temperature of the tube as it passes over the plug is approximately 1600–2000° F., and preferably around 1900° F., some heat having been lost in transferring the tube from the furnace 21 to the rolls 27 and 28. It will be understood that the temperature given by way of illustration can be varied for different grades of material.

The metal of the entire body of the tube 16 is worked by reducing the diameter of the tube as it passes over the plug 30 and through the rolls 27 and 28, but the metal of the weld is worked intensively because of the greater thickness at this region. This working of the weld is both transverse and radial. The internal bead 19 and the external reinforcement 20, if one is present, disappear as the metal of which they are composed is crowded in evenly with the wall of the tube. The wall thickness also can be reduced when rolling over the plug, but whether wall thickness is to be reduced at this time, or how much, depends in each case on how much reduction in wall thickness is to be reserved for the cold drawing operation, and this in turn depends on what physical properties are required in the finished tube.

It will be appreciated that the pipe or tube obtained after hot rolling of the fusion welded billet over the plug is well suited for various uses, and need not in all instances be subjected to the cold drawing treatment.

The reduction in wall thickness possible in a single pass on the draw-bench is limited by the tensile strength of the tube. The plug 30 and rolls 27 and 28 preferably reduce the tube to such size that it can be finished with a single pass on the draw-bench. More than one pass in the hot rolling step of the process may be used, but this is not necessary unless the welded tube is very much larger than the required dimensions of the finished tube.

Following the rolling step illustrated in Fig. 3, the tube 16 is allowed to cool and is then normalized by reheating in furnace 51 (Fig. 4) to the recoalescent point, holding at such heat for some time, and then cooling. This normalizing step improves the grain structure and makes it uniform throughout the tube.

A plurality of tubes 16 are heated in the furnace at the same time. The furnace 51 is heated by means of ducts or burners 53 and the hot gases leave the furnace through breeching 55.

After the normalizing step, each tube 16 is cold drawn. A draw-bench 61, shown diagrammatically in Fig. 5, includes a chain 63 driven by a motor 65 and connected to tongs 67 which grip the end of the tube 16 and draw it through a die 69. The tube 16 is supported on a mandrel 71.

The cold drawing operation reduces the diameter and wall thickness of the tube, and finishes both the inside and outside surface. An enlarged section of the tube after the cold drawing operation is shown in Fig. 10, the diameter and wall thickness of this section being substantially less than in the section shown in Fig. 9.

As an example, if a 2½ or 3 inch welded tube of 10 gauge material (.140 inch wall thickness) is made, this tube serves as a hollow welded billet or blank for reduction, elongation, physical improvement and finishing by the succeeding steps of the process. In the hot rolling step, the diameter of the tube may be decreased 12½% and the wall-thickness may be reduced to .100 inch. It will be understood that these figures are illustrative and that proportionately greater or less changes can be produced in the respective steps, depending on how much working of the metal is desired in each step. Considerable changes in dimensions can be obtained, in a single pass and with the use of comparatively little power, in the hot rolling step, but the working of the metal by cold drawing produces physical properties not obtainable by working the metal while hot.

Fig. 11 shows a modified form of cross rolls 77 and 78 which can be used to roll the tube over the plug. These cross rolls work the metal of the entire body of the tube transversely as well as longitudinally, and are particularly advantageous when it is desired in the rolling step to decrease the wall thickness of the tube without decreasing its outside diameter, and preferably while increasing the inside diameter. Cross rolls such as shown in this view are known in connection with piercing and expanding equipment with which tubing is made from solid billets.

The final product of the process is perfectly finished tubing, accurate to any desired dimensions, uniform in wall-thickness, and of high physical properties. The metal which was the weld in the welded billet is quite absorbed in the continuous wall of the finished tube, and not only is this region at least as strong as any other but any regions of potential weakness away from the weld have been restored by the heat treatments and the workings to which the material has been subjected. After the cold drawing, the strength of the entire wall is greatly increased.

The method of this invention can be performed with apparatus other than that illustrated, and modifications in the procedure may be made without departing from the invention as defined in the claims.

I claim:

1. The method of making welded tubing of high physical properties which comprises forming a hollow billet by fusion welding open-seam stock for the full depth of the seam edges to form a butt-weld with an internal bead along the line of the weld, reheating the hollow welded billet to raise the temperature of the entire body of said hollow billet, and while hot, passing it over a plug and between rolls so as to eliminate the internal bead and work the metal of the weld, and thereafter producing a tube of high physical properties and accurate dimensions by cold drawing the rolled billet.

2. The method of making welded tubing of high physical properties which comprises uniting abutting seam edges of the tube together by fusion welding with complete penetration and an internal bead, passing the tube over a plug and between rolls while hot to work the metal of the weld and bring it to the same thickness as the body of the tube, and thereafter finishing the tube by cold drawing.

3. In the manufacture of pipe or tubing, the steps which comprise forming a hollow welded billet from open-seam stock by fusing the contiguous edges of the seam and producing a reinforced weld having a bead along the line of the weld, thereafter heating the entire body of the hollow billet, passing the heated billet between rolls which reduce its diameter, and at the same time controlling the diameter and eliminating the bead by means of a plug located inside the hollow billet where it passes between the rolls, and thereafter producing a tube of high physical properties and accurate dimensions by cold drawing the rolled billet.

4. In the manufacture of welded tubing, the method which comprises fusing the seam edges of the tube together, and with the entire body of the welded tube heated, passing said tube over a plug between rolls to simultaneously work the metal of the weld and tube body, reduce the diameter of the tube, and make the wall thickness substantially uniform around the circumference of the tube, and then cold drawing the tube to final size and finish.

5. The method of making welded tubing which comprises welding the seam by fusing the edges together, then heating the entire body of the tube and passing it while hot between rolls and over a plug to reduce the wall thickness around the entire circumference of the tube and make said wall thickness substantially uniform around the circumference of the tube, and then finishing the tube to accurate size and increasing its physical properties by a cold drawing operation.

6. The method of manufacturing butt welded pipe which comprises moving open-seam stock through a welding machine and by means of a seamwise-extending flame system melting the seam edges to their full depth thereby producing an elongated puddle in the tube wall, causing this puddle to solidify and form a homogeneous part of the tube wall, heating the body of the tube, and passing the tube while hot between rolls and over a plug to work the metal of the tube around the entire circumference of the tube, and at the same time reduce its diameter and the wall thickness to bring the latter to a substantially uniform value around the circumference of the tube.

7. In the manufacture of pipe or tubing, the steps which comprise heating the entire body of a welded tube to approximately 2000° F., then working the metal of the weld and the tube wall and at the same time eliminating the weld bead by passing the heated tube over a plug and between rolls, and then improving the physical properties and finishing the tube to accurate size by a cold drawing operation.

8. In the manufacture of pipe or tubing, the steps which comprise making a hollow billet by moving open-seam stock through a welding machine and by means of a seamwise-extending flame system melting the seam edges to their full depth thereby producing an elongated puddle between the edges of the seam, causing this puddle to solidify to form a homogeneous part of the wall of the billet with an internal bead along the line of the weld, then heating the body of the welded billet, passing the heated billet over a plug and between rolls so as to eliminate the internal bead and work the metal, then normalizing the rolled billet to improve the grain structure, and producing a finished tube of accurate size by cold drawing.

9. The method of making welded pipe or tubing of high physical properties, which comprises fusion welding the seam of the pipe or tubing and thereafter working the tube while hot to obtain a product of a desired uniform wall thickness and diameter for subsequent cold drawing, cooling the tube after the hot working step to a temperature below the recoalescent point of the metal, reheating and normalizing the tube, and then drawing the cold tube with sufficient reduction in wall thickness to work the metal and produce the desired physical properties.

10. The method of making tubes for cold drawing operations, which method comprises initially butt-welding a tube with a reinforced weld of greater thickness than the body of the tube, and thereafter hot rolling the tube over a plug to work the metal of the weld and make the thickness of the tube wall uniform.

11. The method of manufacturing pipe or tubing which comprises initially making a hollow welded billet by passing thick-walled, tubularly formed, open-seam stock under a seamwise-extending system of flame which causes the seam edges to be welded progressively along the length of said stock, then heating the entire body of the welded billet, rolling said welded billet into a tube of predetermined diameter by passing said billet through rolls while heated, and controlling the inside diameter of the tube with a plug or mandrel in the tube where it passes between said rolls.

JAMES L. ANDERSON.